United States Patent
Douglas et al.

(10) Patent No.: US 11,086,605 B1
(45) Date of Patent: Aug. 10, 2021

(54) PROCESSING PORTABLE EXTENSIONS AT BUILD TIME

(71) Applicant: Red Hat, Inc., Raleigh, NC (US)

(72) Inventors: Stuart Douglas, Orange (AU); Martin Kouba, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/831,284

(22) Filed: Mar. 26, 2020

(51) Int. Cl.
G06F 9/44 (2018.01)
G06F 8/41 (2018.01)
G06F 16/907 (2019.01)
G06F 9/30 (2018.01)
G06F 9/455 (2018.01)
G06F 8/51 (2018.01)

(52) U.S. Cl.
CPC .............. *G06F 8/433* (2013.01); *G06F 8/443* (2013.01); *G06F 8/51* (2013.01); *G06F 9/30087* (2013.01); *G06F 9/45508* (2013.01); *G06F 16/907* (2019.01)

(58) Field of Classification Search
CPC ........................................................ G06F 9/44
See application file for complete search history.

(56) References Cited

U.S. PATENT DOCUMENTS

| 2008/0240154 A1* | 10/2008 | Oved ...................... H04L 69/32 370/466 |
| 2010/0275180 A1* | 10/2010 | Alex ......................... G06F 8/71 717/106 |
| 2011/0197175 A1* | 8/2011 | Bouz ....................... G06F 8/658 717/107 |
| 2012/0233593 A1 | 9/2012 | Sahoo et al. |

OTHER PUBLICATIONS

Quarkus—Writing Your Own Extension, https://quarkus.io/guides/writing-extensions, retrieved on Nov. 28, 2019 (48 pages).
Baeldung, CDI Portable Extension and Flyway, https://www.baeldung.com/cdi-portable-extension, retrieved on Nov. 28, 2018 (8 pages).
How to serialize an injected bean?, Java, https://stackoverflow.com/questions/45828159/how-to-serialize-an-injected-bean, retrieved on Nov. 28, 2019, 5 pages.

* cited by examiner

*Primary Examiner* — Jae U Jeon
(74) *Attorney, Agent, or Firm* — K&L Gates LLP

(57) ABSTRACT

A method includes receiving an application, where the application includes an extension and a metadata model. The method also includes instantiating the extension and firing an event. The method also includes upon detecting the event at the instantiated extension, creating metadata associated with the application, collecting the metadata associated with the application, and revising the metadata model based on the collected metadata.

16 Claims, 7 Drawing Sheets

PROCESSING PORTABLE EXTENSIONS AT BUILD TIME

BACKGROUND

Computer systems may run applications or services that are provided via a server or cloud. The applications or services can be developed, and then deployed at runtime. Application instances or services may run within containers, which may be run on physical or virtual machines. The containers may be used to separate various components of a computing system. For example, different components of a computing system may be executed at different containers and/or virtual machines executing on a computing device.

The containers may encapsulate a runtime environment for an application instance or service. Application instances may be started or replicated across nodes and each application instance may require configuration objects (e.g., lists, collections, arrays, etc. used for configuration), classes, artifacts, dependencies, annotations, libraries, etc. to be loaded at various times.

SUMMARY

The present disclosure provides new and innovative systems and methods for processing portable extensions at build time. In an example, a system includes a memory and a processor, where the memory is in communication with the processor. The processor is configured to perform compiling source code of an application. The source code includes a portable extension. A metadata model is created with metadata collected during the compilation of the source code and the portable extension is instantiated. A plurality of events associated with the portable extension are executed. When executed, each of the events creates changes in the metadata, which effects the metadata model. The metadata model is updated with the changes in the metadata and encoded into byte code.

In an example, a method includes compiling source code of an application, where the source code includes a portable extension. A metadata model is created with metadata collected during the compilation of the source code. Next, the portable extension is instantiated. Events associated with the portable extension are executed. When executed, the events cause the portable extension to creates changes in the metadata originally used to create the metadata model. The metadata model is then updated with the changes in the metadata and bytecode is encoded based on the meta model.

In an example, a method includes receiving an application, where the application includes an extension and a metadata model. The extension is instantiated and an event is fired. When the instantiated extension detects the event, metadata associated with the application is created. The metadata is collected and used to revise the metadata model.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF PREFERRED EMBODIMENTS

Figure 1:
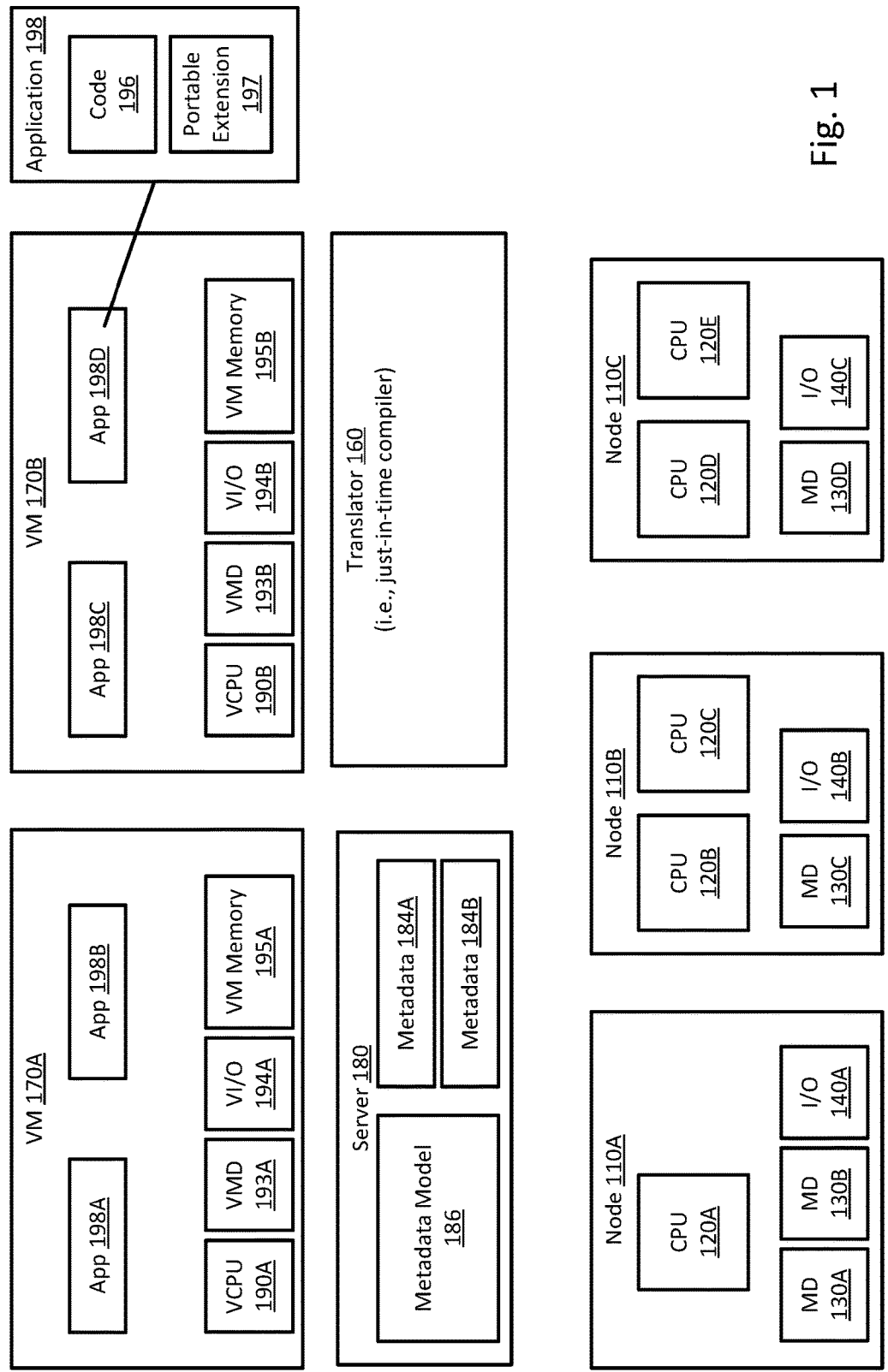
FIG. 1 illustrates a high-level component diagram of an example computing system according to an example embodiment of the present disclosure.

Techniques are disclosed for processing portable extensions at build time to reduce application startup time and runtime memory usage. Processing portable extensions prior to runtime (e.g., at build time) improves efficiency by allowing runtime services to start sooner and with a smaller runtime memory footprint. Specifically, by processing portable extensions once prior to runtime, rather than on every startup, less resources are used when starting nodes and instances of application in a cloud environment.

Typically, application metadata is processed at runtime to start application services. In one example, frameworks that create jars, such as "uberjars", which may also be referred to as "over-jars" or "fat-jars", are used to create single application packages. An uber-jar is a jar that contains a package and all the package dependencies in a single Java Archive ("JAR") file. An advantage of an uber-jar is that the uber-jar can be distributed to and loaded at a destination regardless of whether that destination has the appropriate dependencies installed at the destination. Since the package dependencies are part of the JAR file for an uber-jar, the uber-jar has no other external dependencies, and thus can be implemented at a destination regardless of whether that destination has the package dependencies preloaded.

When working with uber-jars, most of the details of an application are typically known at build time. However, the inclusion of portable extensions can cause additional complications to processing metadata for uber-jars. Typically, portable extensions refer to an extension to a frameworks (e.g., a class or a set of classes) that are tailored to a specific use case. Generally, portable extensions are processed at runtime, as they potentially modify the metadata model for an application after build time. Generally, a portable extension can be integrated with a container in a multitude of ways. For example, a portable extension can provide its own beans, interceptors, and decorators to a container. A portable extension can inject dependencies into its own objects using the dependency injection service. A portable extension can provide a context implementation for a custom scope. A portable extension can augment or override the annotation-based metadata with metadata from another source. Generally, portable extensions are processed at startup of runtime, as the implementation of portable extensions contain fundamental incompatibilities with a build time based system. Traditionally, portable extensions may be problematic due to the potential of the portable extension, when processed, to modify any part of the application's metadata at boot time, including, but not limited to, adding, removing, and modifying beans.

Generally, processing any portion of the application, portable extension, and/or metadata at run time results in a slower startup and additional memory usage. For example, when the metadata is processed at runtime, eXtensible Markup Language ("XML") and annotations are parsed and then processed at runtime to form a complete deployment model. Parsing and processing the XML and annotations may involve loading several different classes, which increase the memory footprint of the application. The disadvantages associated with the slower startup times and additional memory usage are augmented when implementing application instances on a cloud. For example, hundreds to thousands of application instances may be deployed and started on the cloud, and each instance may incur these additional memory costs.

As described in the various example embodiments disclosed herein, to eliminate the need to process metadata at runtime, the system and methods disclosed herein advantageously process portable extensions at build time, update an application's metadata model with any resulting changes, and transform the resulting metadata into bytecode (e.g., Java Virtual Machine ("JVM") bytecode), which can be directly executed. For example, the system may process metadata, build a deployment model, and generate bytecode that bootstraps the services. Subsequently, the system may instantiate a portable extension associated with an application, execute events associated with the portable extensions, and update the deployment model with changes to the metadata model. In some examples, objects within a metadata model, or the metadata model itself, can be serialized before being encoded into bytecode. Then, when the application is started, the bytecode is run directly, allowing runtime services to be started efficiently, thereby reducing startup times and reducing the memory footprint of the application.

Specifically, portable extensions are processed once, rather than on every application startup. By processing each portable extension up front at build time, fewer resources are used when starting nodes in a cloud environment. The present disclosure is especially advantageous to cloud providers that want to optimize the efficiency of the cloud by reducing startup times and reducing memory usage. For example, cloud providers like Red Hat® Cloud Suite may utilize bytecode for application instances to reduce overhead. Additionally, the application loads classes that are required for runtime, and not for deployment, which reduces the memory footprint of the application. Conversely, in traditional application server approaches, a large number of classes are loaded at runtime even though these classes are typically only used at deployment time to process deployment metadata. These classes loaded for deployment often remain present after the application is started and result in a constant drag on the memory system. However, the systems and methods disclosed herein load less classes at runtime, which translates into less runtime memory usage because the resulting deployed application is smaller (i.e., it contains less classes).

FIG. 1 depicts a high-level component diagram of an example computing system 100 in accordance with one or more aspects of the present disclosure. The computing system 100 may include a server 180, translator 160, one or more virtual machines (VM 170A-B), and nodes (e.g., nodes 110A-C).

Server 180 may store metadata (e.g., metadata 184A-B) for various applications (e.g., Applications 198A-D, 198 generally). In an example, Applications 198A-D may be different applications or services. In another example, applications 198A-D may be different instances of the same application or service. In various examples, each application 198 may include code 196 and one or more portable extensions 197. The metadata (e.g., metadata 184A-B) for the various applications may include applications artifacts, dependencies, XML, annotations, libraries, etc. Dependencies may include tools, package management software (e.g., Red Hat Package Manager or other package management tools), etc. Dependencies may also include runtime dependencies that are required for execution, compile dependencies used during application compilation, system dependencies, etc.

Virtual machines 170A-B may include a virtual machine memory (VM Memory), a virtual CPU (VCPU), virtual memory devices (VMD), and virtual input/output devices (VI/O). For example, virtual machine 170A may include virtual machine memory 195A, a virtual CPU 190A, a virtual memory devices 192A, and a virtual input/output device 194A. Similarly, virtual machine 170B may include virtual machine memory 195B, a virtual CPU 190B, a virtual memory devices 192B, and a virtual input/output device 194B.

Translator 160 may be a dynamic translator. In an example, translator 160 may be a compiler, such as a just-in-time ("JIT") compiler. The translator may compile code 196 and portable extension 197 to create metadata (e.g., metadata 184A-B, referred to generally as metadata 184). The translator 160 may process metadata 184 and build a deployment model for the application. The translator 160 may also generate an intermediate representation from the deployment model, such as bytecode (e.g., JVM bytecode). The bytecode may bootstrap runtime services by directly calling runtime classes when the bytecode is executed. In an example, the translator 160 may translate bytecode into machine code for the virtual machines 170A-B at runtime. The translator 160 may be a program running on a processor (e.g., CPU 120A-E or VCPU 190A-B). For example, VCPU 190A and VCPU 190B may each have their own translator that runs on the processor.

In an example, a virtual machine 170A may execute a guest operating system and run applications 198A-B which may utilize the underlying VCPU 190A, VIVID 192A, and VI/O device 194A. One or more applications 198A-B may be running on a virtual machine 170A under the respective guest operating system. A virtual machine (e.g., VM 170A-B, as illustrated in FIG. 1) may run on any type of dependent, independent, compatible, and/or incompatible applications on the underlying hardware and operating system ("OS"). In an example, applications (e.g., App 198A-B) run on a virtual machine 170A may be dependent on the underlying hardware and/or OS. In another example embodiment, applications 198A-B run on a virtual machine 170A may be independent of the underlying hardware and/or OS. For example, applications 198A-B run on a first virtual machine 170A may be dependent on the underlying hardware and/or OS while applications (e.g., application 198C-D) run on a second virtual machine (e.g., VM 170B) are independent of the underlying hardware and/or OS. Additionally, applications 198A-B run on a virtual machine 170A may be compatible with the underlying hardware and/or OS 186. In an example embodiment, applications 198A-B run on a virtual machine 170A may be incompatible with the underlying hardware and/or OS 186. For example, applications 198A-B run on one virtual machine 170A may be compatible with the underlying hardware and/or OS 186 while applications 198C-D run on another virtual machine 170B are incompatible with the underlying hardware and/or OS 186.

In an example, virtual machines 170A-B may instead be containers that execute applications or services, such as microservices. In an example, the containers may each run a process or service and the containers may be any execution environment. For example, the containers may be a virtual server. It should be appreciated that containers may be stand alone execution environments, similar to that of a virtual machine. The applications 198A-D or services (e.g., microservices) may run in a software container or a virtual machine (e.g., virtual machines 170A-B).

The computer system 100 may include one or more nodes 110A-C. Each node 110A-C may in turn include one or more physical processors (e.g., CPU 120A-E) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 170A-B may be provisioned on the same host or node (e.g., node 110A) or different nodes. For example, VM 170A and VM 170B may both be provisioned on node 110A. Alternatively, VM 170A may be provided on node 110A while VM 170B is provisioned on node 110B.

As used herein, physical processor or processor 120A-E refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors (e.g., CPUs 120A-E) may be interconnected using a variety of techniques, ranging from a point-to-point processor interconnect, to a system area network, such as an Ethernet-based network. Local connections within each node, including the connections between a processor 120A-E and a memory device 130A-D may be provided by one or more local buses of suitable architecture, for example, peripheral component interconnect (PCI).

Figure 2:
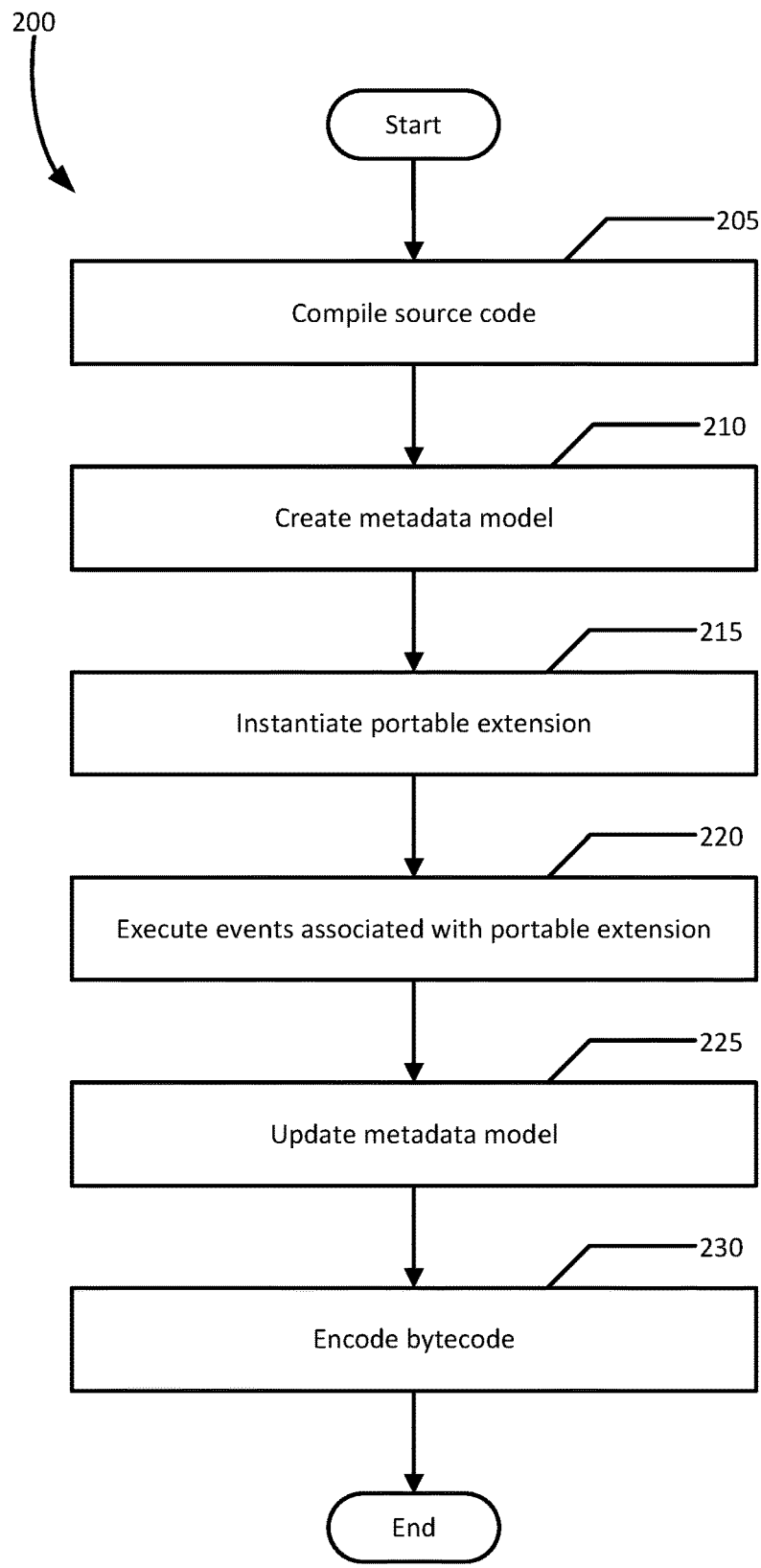
FIG. 2 illustrates a flowchart of an example method for processing portable extensions according to an example embodiment of the present disclosure.

FIG. 2 illustrates a flowchart of an example method for processing portable extensions, in accordance with an embodiment of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, blocks may be repeated and some of the blocks described are optional. The method 200 may be performed by processing logic that may comprise hardware (circuitry, dedicated logic, etc.), software, or a combination of both.

The example method 200 includes compiling a source code of an application (block 205). For example, translator 160 compiles and processes code 196 and portable extension 197 to create metadata 184A and metadata 184B respectively. Next the example method 200 includes creating a metadata model (block 210). For example, the translator 160 processes the metadata 184A associated with the code 196 to create the metadata model 186. In various examples, when the translator 160 creates the metadata model 186, the translator removes redundant portions of the metadata 184A that are already included in the metadata model 186. Next, the example method 200 also includes instantiating a portable extension (block 215). For example, in order to process the portable extension 197 at build time, the translator 160 instantiates the portable extension 197 using metadata 184B and is configured to collect any changes to the metadata 184A due execution of the portable extension 197. The example method 200 includes executing events associated with the portable extension (block 220). For example, the translator 160 executes initialization events to collect any metadata changes created by the portable extension 197. In various examples, the initialization events include, but are not limited to, a BeforeBeanDiscovery event, a ProcessAnnotated Type event, AfterTypeDiscover event, AfterBeanDiscovery event, and a AfterDeploymentValidation event. The results of completing one or more of the events potentially makes changes to metadata 184A, which was used to create the metadata model 186. Next, the example method 200 includes updating the metadata model (block 225). For example, the updates to the metadata 184A created by the initialization events are incorporated into the metadata model 186. Next, the example method 200 includes encoding bytecode based on the updated metadata model (block 230). For example, the translator 160 subsequently uses the metadata model 186 to encode bytecode for the application 198.

In various examples, the translator 160 is capable of serializing a resulting metadata model 186. For example, the translator 160 may receive the metadata model 186 and output a serialization of each object within the metadata model 186. In these instances, the translator 160 analyzes the metadata model 186 to determine objects within the metadata model 186. For each object within the metadata model 186, the translator 160 may create a "shell" or empty new object and then write bytecode for the various elements of the objects within the metadata model 186 or set each field of the "shell" or empty new object, such that the bytecode can be executed to recreate the object from the metadata model 186. For example, a translator 160 may write different portions of bytecode together to recreate an object within the metadata model 186.

The bytecode may be executed to recreate a serialized object from the metadata model 186, which may be used to start runtime services for various applications (e.g., Applications 198A-D). For example, the bytecode may recreate a serialized object to configure runtime services. Additionally, the bytecode may be translated into machine code for the virtual machines 170A-B at runtime. In an example, applications 198A-D may be different applications or services. In another example, applications 198A-D may be different instances of the same application or service.

In some examples, the translator 160 may record a result of each class definition created during the execution of each event. The result of each class definition are incorporated into the application 198. In other examples, the translator may incorporate the resulting bytecode created from the metadata model 186 into the application. In some instances, incorporating bytecode into an application may mean including the bytecode within a jar file of the application. In various examples, bytecode means Java bytecode. In some examples, a portable extension is a context and dependency injection (CDI) portable extension.

Figure 3:
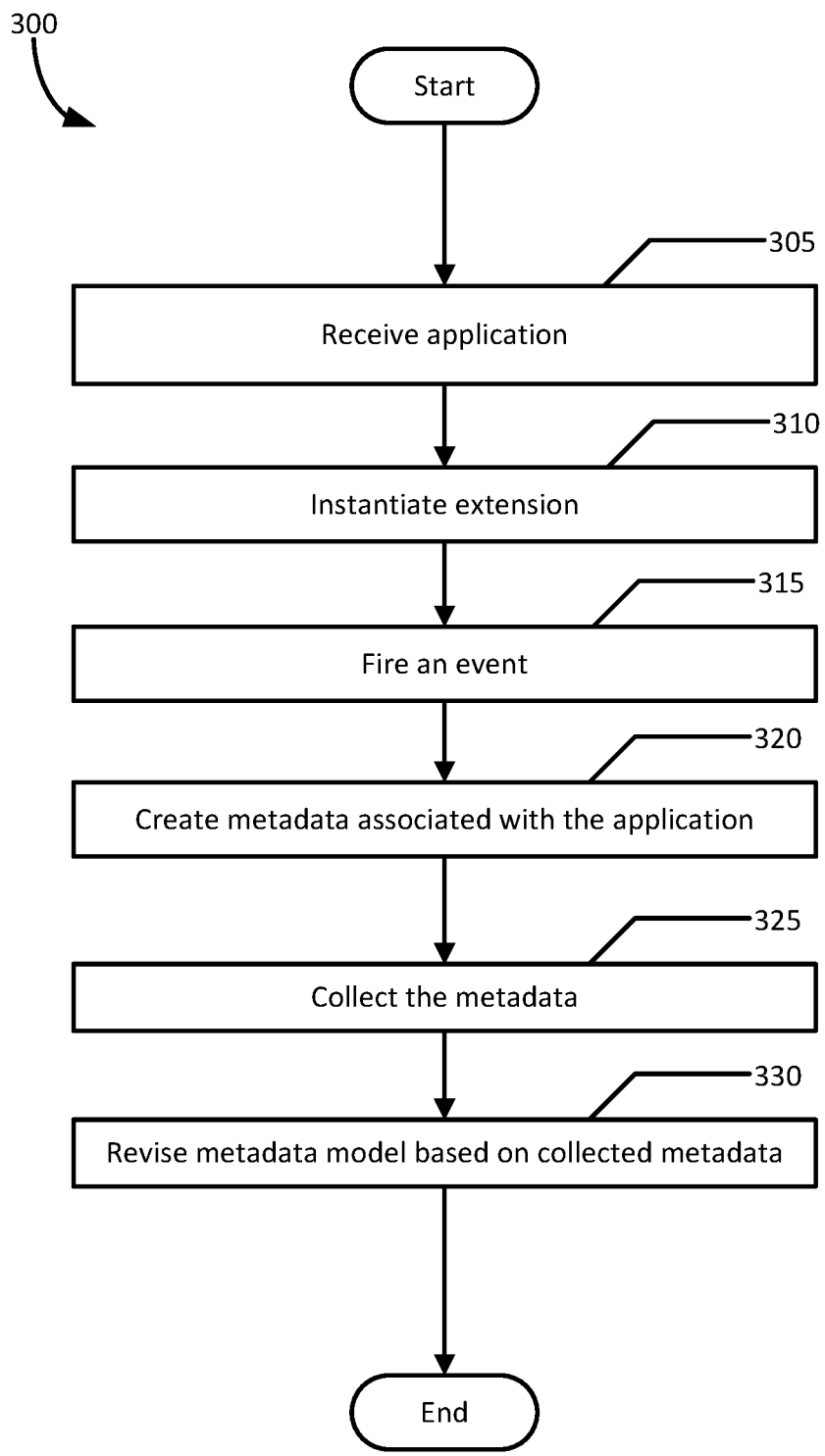
FIG. 3 illustrates a flowchart of an alternate example method processing portable extensions for an application, in accordance with an embodiment of the present disclosure.

FIG. 3 illustrates a flowchart of an alternate example method for processing portable extensions, in accordance with an embodiment of the present disclosure. Although the example method 300 is described with reference to the flowchart illustrated in FIG. 3, it will be appreciated that many other methods of performing the acts associated with the method 200 may be used. For example, the order of some of the blocks may be changed, certain blocks may be combined with other blocks, blocks may be repeated and some of the blocks described are optional. The method 300 may be performed by processing logic that may comprise hardware (circuitry, dedicated logic, etc.), software, or a combination of both.

The example method 300 includes receiving an application (block 305). For example, a translator 160 can be separate from an initial compiler. In these instances, the translator 160 may receive a metadata model 186 and portable extension 197 for processing. The translator 160 may process the portable extension 197 to create metadata 184B. Next, the portable extensions are instantiated (block 310). For example, the translator 160 may instantiate the portable extension 197 using metadata 184A. Next, an event is fired (block 315). For example, once instantiated, the translator 160 can interact with the portable extension 197. The translator 160 can fire events to cause the portable extension to respond and/or modify metadata. For example, the translator can fire a BeforeBeanDiscovery event, which may cause the instantiated portable extension to perform certain actions, such as, but not limited to, observing, and/or modifying the metadata 184B, which in turn will modify the metadata model 186. Next, metadata is created associated with the application (block 320). For example, when an event is received by the portable extension 197, metadata 184B is created which are updates to metadata 184A, where metadata 184A was used to create the metadata model 186. Next, metadata created as a result of the events are collected (block 325) and the metadata model is revised based on the collected metadata (block 330). For example, the translator 160 is capable of collected metadata created by the portable extension 197 when the events were fired by the translator 160. In this instance, as the metadata 184B are updates to the metadata 184A, the translator 160 revises and/or regenerates the metadata model 186 based on the updated metadata 184B.

Figure 4:
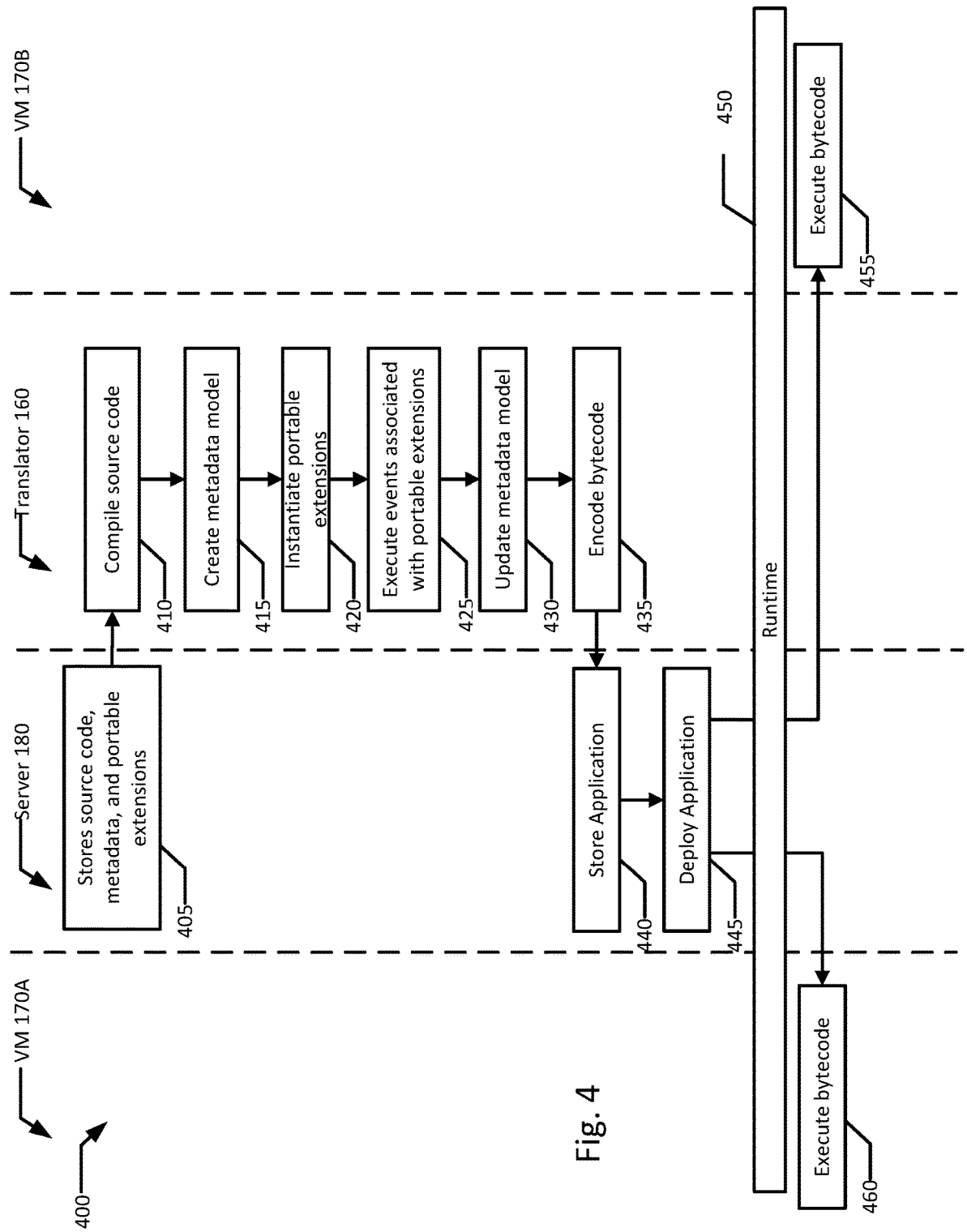
FIG. 4 illustrates a flow diagram of an example method of processing portable extensions when building an application, in accordance with an embodiment of the present disclosure.

FIG. 4 illustrates a flow diagram of an example method of processing portable extensions when building an application, in accordance with an embodiment of the present disclosure. Although the example method 400 is described with reference to the flow diagram illustrated in FIG. 4, it will be appreciated that many other methods of performing the acts associated with the method 400 may be used. For example, the order of some of the blocks may be changed, certain blocks may be combined with other blocks, blocks may be repeated, and some of the blocks described are optional. For example, in the illustrated flow diagram, a server 180 is using a translator 160 when building an application 198 for use in VM 170A and VM 170B.

As shown in FIG. 4, server 180 is storing source code, metadata, and portable extensions associated with an application 198 (block 405). The server 180 uses the translator 160 to process the source code 196 and portable extensions 197. The translator 160 compiles the source code 196, which creates metadata 184A (block 410). The translator then uses the metadata 184A to create a metadata model 186 (block 416). The translator 160 instantiates the portable extension 197 (block 420). Next, the translator 160 executes one or more events to initiate a startup response from the portable extension 197 (block 425). In various examples, execution of events causes the portable extension 197 to revise and/or create new metadata 184B associated with the application 198. In these embodiments, the metadata 184B is associated with metadata 184A, which was used to create the metadata model 186. The translator 160 collects the metadata 184B and updates the metadata model 186 using both the metadata 184A and metadata 184B (block 430). Next, the translator 160 encodes the application 198 into bytecode using the metadata model 186 as an input. In some examples, the translator 160 may use a serializer to further optimize the encoded bytecode. In various examples, a translator 160 may include serializing functionality.

Upon completion of the encoding of the bytecode, the server 180 stores the application (block 440) and deploys the application 198 (block 445). At runtime (block 450), the application 198 is made available to VM 170A and VM 170B. Next, VM 170 downloads the application 198 from the server 180 and executes the bytecode (block 460). Similarly, VM 170B downloads the application 198 from the server 180 and executes the bytecode (block 455).

Figure 5:
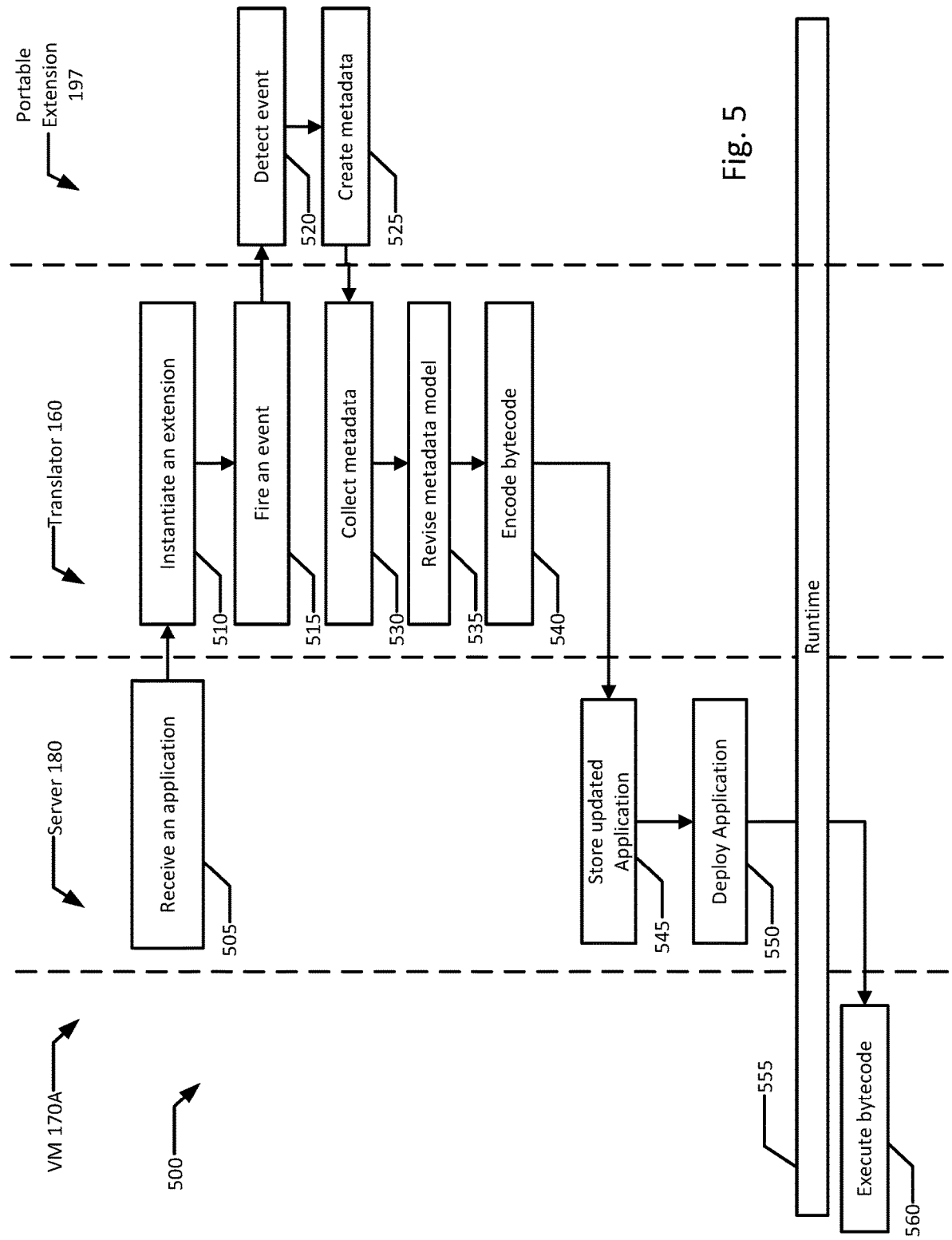
FIG. 5 illustrates a flow diagram of another example method of processing portable extensions when building an application, according to an example embodiment of the present disclosure.

FIG. 5 illustrates a flow diagram of another example method of processing portable extensions when building an application, in accordance with an embodiment of the present disclosure. Although the example method 500 is described with reference to the flow diagram illustrated in FIG. 5, it will be appreciated that many other methods of performing the acts associated with the method 500 may be used. For example, the order of some of the blocks may be changed, certain blocks may be combined with other blocks, blocks may be repeated, and some of the blocks described are optional. For example, in the illustrated flow diagram, a server 180 is using a translator 160 to interact with a portable extension 197 when building an application 198 for use in VM 170A.

As shown in FIG. 5, the server 180 receives an application (block 505). The application is a jar file including a metadata model 186 and a portable extension 197. The translator 160 instantiates the portable extension 197 (block 510). The translator 160 fires one or more events (block 515). The portable extension 197 detects an event (block 520) and creates metadata based on the event (block 525). For example, a portable extension 197 may extend the capabilities of a container class by providing additional functionality, such as the addition and/or update of security protocols to facilitate secure transactions between containers. In this instance, the portable extension 197 includes additional and/or expanded functionality that is used in place of the original functions of the container. As such, the metadata 184B created from the portable extension 197 is modified from the metadata 184 to utilize the new functionality. The translator 160 then collects the metadata 184B created by the portable extension 197 (block 530) and revises the metadata model 186 within the jar file (block 535). Next, the translator 160 encodes bytecode using the metadata 184 as an input (block 540). The translator 160 places the byte code and metadata model within the jar file and provides the file to the server 180. The server 180 stores the updated application (block 545) and deploys the application (block 550). At runtime, the VM 170A executes the bytecode within the jar file (block 560).

Figure 6:
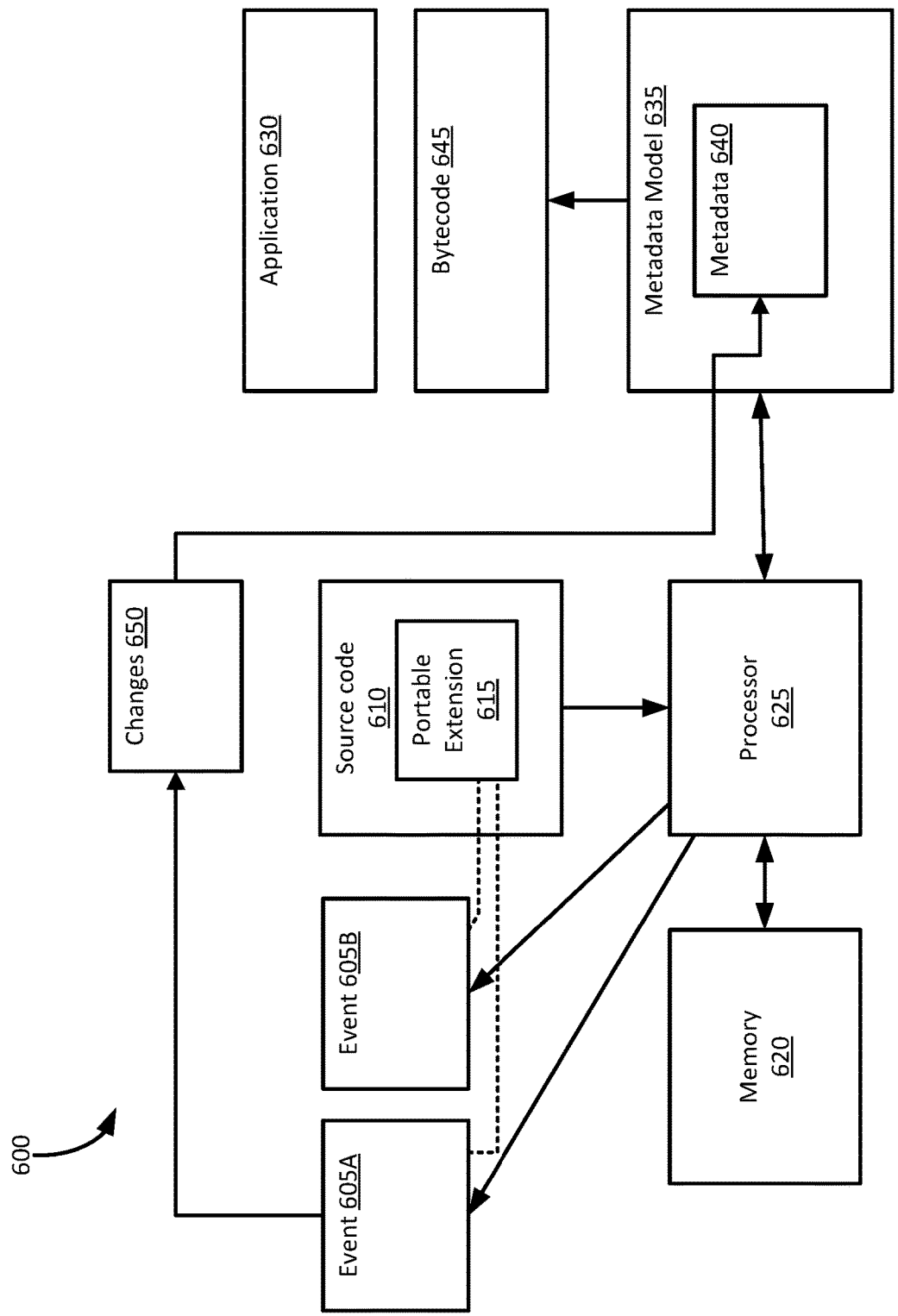
FIG. 6 illustrates a block diagram of an example system for compiling and building an application according to an example embodiment of the present disclosure.

FIG. 6 is a block diagram of a system 600 includes a memory 620 and a processor 625. The processor 625 is in communication with the memory 620. The processor 625 compiles the source code 610 of an application 630 where the source code 610 includes a portable extension 615. The processor 625 creates a metadata model 635 from metadata 640 collected during the compilation of the source code 610. The processor 625 instantiates the portable extension 615 and executes a plurality of events 605A, 605B. At least one of the events 605A creates changes 650 to the metadata 640 used to create the metadata model 635. The processor updates the metadata model 635 with the changes 650 from the metadata 640. Upon completion, the processor encodes bytecode 645 using the metadata model 635 as an input.

Figure 7:
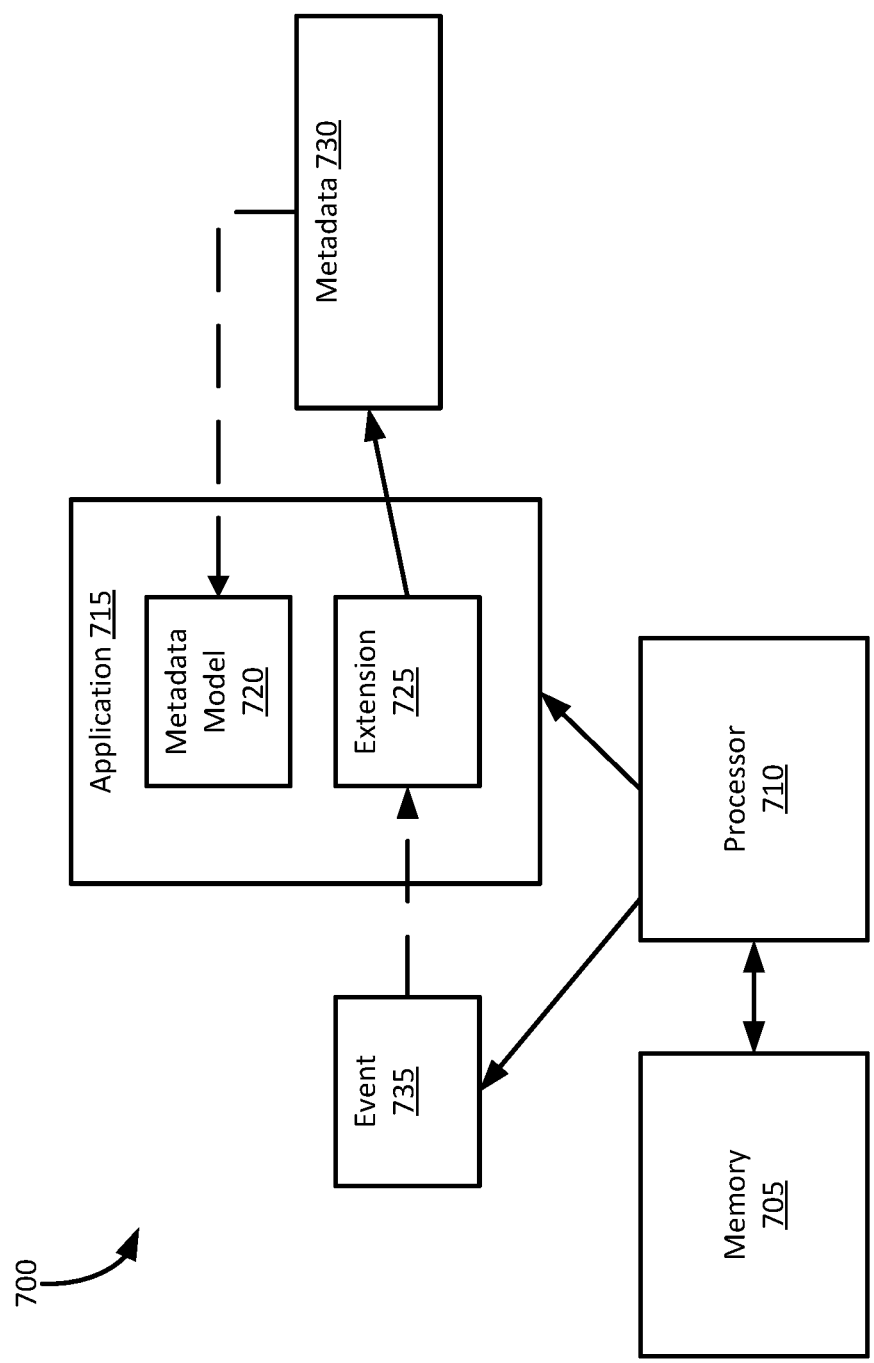
FIG. 7 illustrates a block diagram of an example of a system for building an application according to an example embodiment of the present disclosure.

FIG. 7 is a block diagram of a system 700 which includes a memory 705 and a processor 710, where the processor 710 is in communication with the memory 705. The processor 710 receives an application 715 including a metadata model 720 and an extension 725. The processor 710 instantiates the extension 725 and fires an event 735. Upon detecting the event 735 at the instantiated extension 725, the processor 710 creates metadata 730 associated with the application 715. The processor 710 collects the metadata 730 associated with the application 715 and revises the metadata model 720 based on the collected metadata 730.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure, a system includes a memory; and a processor in communication with the memory, wherein the processor is configured to perform: compiling source code of an application, wherein the source code includes a portable extension; creating a metadata model with metadata collected during the compilation of the source code; instantiating the portable extension; executing a plurality of events associated with the portable extension, wherein at least one of the plurality of events, when executed, creates changes in the metadata used to create the metadata model; updating the metadata model with the changes in the metadata; and encoding bytecode using the metadata model as an input.

In a 2nd exemplary aspect of the present disclosure, which may be used in combination with any one of more of the preceding aspects (i.e., the 1st aspect), where the processor is further configured to perform writing a serialized representation of an instance of the portable extension to bytecode.

In a 3rd exemplary aspect of the present disclosure, which may be used in combination with any one of more of the preceding aspects (i.e., the 1st aspect), where the processor is further configured to perform recording a result of each class definition created during the execution of the plurality of events; and incorporating the results into the application.

In a 4th exemplary aspect of the present disclosure, which may be used in combination with any one of more of the preceding aspects (i.e., the 1st aspect), where the processor is further configured to perform incorporating the bytecode of the metadata model into the application.

In a 5th exemplary aspect of the present disclosure, which may be used in combination with any one of more of the preceding aspects (i.e., the 1st aspect), the system further including a compiler in communication with the processor.

In a 6th exemplary aspect of the present disclosure, which may be used in combination with any one of more of the preceding aspects (i.e., the 1st aspect), where the portable extension is a context and dependency injection (CDI) portable extension.

Aspects of the subject matter described herein may be useful alone or in combination with one or more other aspects described herein. In a 7th exemplary aspect of the present disclosure, a method includes compiling source code of an application, wherein the source code includes a portable extension; creating a metadata model with metadata collected during the compilation of the source code; instantiating the portable extension; executing a plurality of events associated with the portable extension, wherein at least one of the plurality of events, when executed, creates changes in the metadata used to create the metadata model; updating the metadata model with the changes in the metadata; and encoding bytecode using the metadata model as an input.

In an 8th exemplary aspect of the present disclosure, which may be used in combination with any one of more of the preceding aspects (i.e., the 7th aspect), the method further including writing a serialized representation of an instance of the portable extension to bytecode.

In an 9th exemplary aspect of the present disclosure, which may be used in combination with any one of more of the preceding aspects (i.e., the 7th aspect), the method further including recording a result of each class definition created during the execution of the plurality of events; and incorporating the results into the application.

In an 10th exemplary aspect of the present disclosure, which may be used in combination with any one of more of the preceding aspects (i.e., the 7th aspect), the method further including incorporating the bytecode of the metadata model into the application.

In an 11th exemplary aspect of the present disclosure, which may be used in combination with any one of more of the preceding aspects (i.e., the 7th aspect), the method further including where the bytecode is Java bytecode.

In an 12th exemplary aspect of the present disclosure, which may be used in combination with any one of more of the preceding aspects (i.e., the 7th aspect), the method further including wherein the portable extension is a context and dependency injection (CDI) portable extension.

Aspects of the subject matter described herein may be useful alone or in combination with one or more other aspects described herein. In a 13th exemplary aspect of the present disclosure, a non-transitory machine readable medium storing code, which when executed by a processor is configured to compile source code of an application, wherein the source code includes a portable extension; create a metadata model with metadata collected during the compilation of the source code; instantiate the portable extension; execute a plurality of events associated with the portable extension, wherein at least one of the plurality of events, when executed, creates changes in the metadata used to create the metadata model; update the metadata model with the changes in the metadata; and encoding bytecode using the metadata model as an input.

In an 14th exemplary aspect of the present disclosure, which may be used in combination with any one of more of the preceding aspects (i.e., the 13th aspect), where the code, when executed by a processor is further configured to write a serialized representation of an instance of the portable extension to bytecode.

In an 15th exemplary aspect of the present disclosure, which may be used in combination with any one of more of the preceding aspects (i.e., the 13th aspect), where the code, when executed by a processor, is further configured to record a result of each class definition created during the execution of the plurality of events; and incorporate the results into the application.

In an 16th exemplary aspect of the present disclosure, which may be used in combination with any one of more of the preceding aspects (i.e., the 13th aspect), where the code, when executed by a processor, is further configured to incorporate the bytecode of the metadata model into the application.

In an 17th exemplary aspect of the present disclosure, which may be used in combination with any one of more of the preceding aspects (i.e., the 13th aspect), where the bytecode is Java bytecode.

In an 18th exemplary aspect of the present disclosure, which may be used in combination with any one of more of the preceding aspects (i.e., the 13th aspect), where the portable extension is a context and dependency injection (CDI) portable extension.

Aspects of the subject matter described herein may be useful alone or in combination with one or more other aspects described herein. In a 19th exemplary aspect of the present disclosure, a system including a means to compile source code of an application; a means to create a metadata model with metadata collected during the compilation of the source code; a means to instantiate a portable extension; a means to execute a plurality of events associated with the portable extension, wherein at least one of the plurality of events executed on the portable extension creates changes in the metadata used to create the metadata model; a means to update the metadata model with the changes in the metadata; and a means to output the metadata model to bytecode.

Aspects of the subject matter described herein may be useful alone or in combination with one or more other aspects described herein. In a 20th exemplary aspect of the present disclosure, a system including a memory; and a processor in communication with the memory, wherein the processor is configured to perform: receiving an application, wherein the application includes an extension and a metadata model; instantiating the extension; firing an event; upon detecting the event at the instantiated extension, creating metadata associated with the application; collecting the metadata associated with the application; and revising the metadata model based on the collected metadata.

In an 21st exemplary aspect of the present disclosure, which may be used in combination with any one of more of the preceding aspects (i.e., the 20th aspect), where the event is selected from the group consisting of a BeforeBeanDiscovery event, ProcessAnnotatedType event, AfterTypeDiscovery event, AfterBeanDiscovery event, and AfterDeploymentValidation event.

In an 22nd exemplary aspect of the present disclosure, which may be used in combination with any one of more of the preceding aspects (i.e., the 20th aspect), where the processor is further configured to perform encoding bytecode using the revised metadata model as an input.

In an 23rd exemplary aspect of the present disclosure, which may be used in combination with any one of more of the preceding aspects (i.e., the 22nd aspect), where the bytecode is Java bytecode.

In an 24th exemplary aspect of the present disclosure, which may be used in combination with any one of more of the preceding aspects (i.e., the 20th aspect), the system further including a cloud application server; and a computer system, wherein computer system includes the memory and processor.

In an 25th exemplary aspect of the present disclosure, which may be used in combination with any one of more of the preceding aspects (i.e., the 24th aspect), where the processor is further configured to perform deploying the application to the cloud application server.

Aspects of the subject matter described herein may be useful alone or in combination with one or more other aspects described herein. In a 26th exemplary aspect of the present disclosure, a method including receiving an application, wherein the application includes an extension and a metadata model; instantiating the extension; firing an event; upon detecting the event at the instantiated extension, creating metadata associated with the application; collecting the metadata associated with the application; and revising the metadata model based on the collected metadata.

In a 27th exemplary aspect of the present disclosure, which may be used in combination with any one of more of the preceding aspects (i.e., the 25th aspect), where the event is selected from the group consisting of a BeforeBeanDiscovery event, ProcessAnnotatedType event, AfterTypeDiscovery event, AfterBeanDiscovery event, and AfterDeploymentValidation event.

In an 28th exemplary aspect of the present disclosure, which may be used in combination with any one of more of the preceding aspects (i.e., the 26th aspect), the method further including encoding bytecode using the revised metadata model as an input.

In an 29th exemplary aspect of the present disclosure, which may be used in combination with any one of more of the preceding aspects (i.e., the 28th aspect), where the bytecode is Java bytecode.

In an 30th exemplary aspect of the present disclosure, which may be used in combination with any one of more of the preceding aspects (i.e., the 26th aspect), the method further comprising deploying the application to a cloud application server.

In an 31th exemplary aspect of the present disclosure, which may be used in combination with any one of more of the preceding aspects (i.e., the 26th aspect), the method further comprising writing a serialized representation of an instance of the extension to bytecode.

In an 32nd exemplary aspect of the present disclosure, which may be used in combination with any one of more of the preceding aspects (i.e., the 26th aspect), where collecting includes recording a result of each class definition created during the firing of the event; and incorporating the results into the application.

In an 33rd exemplary aspect of the present disclosure, which may be used in combination with any one of more of the preceding aspects (i.e., the 26th aspect), where the extension is a context and dependency injection (CDI) portable extension.

Aspects of the subject matter described herein may be useful alone or in combination with one or more other aspects described herein. In a 34th exemplary aspect of the present disclosure, a non-transitory machine readable medium storing code, which when executed by a processor is configured to receive an application, wherein the application includes an extension and a metadata model; instantiating the extension; firing an event; upon detecting the event at the instantiated extension, creating metadata associated with the application; collecting the metadata associated with the application; and revising the metadata model based on the collected metadata.

In an 35th exemplary aspect of the present disclosure, which may be used in combination with any one of more of the preceding aspects (i.e., the 34th aspect), where the event is selected from the group consisting of a BeforeBeanDiscovery event, ProcessAnnotatedType event, AfterTypeDiscovery event, AfterBeanDiscovery event, and AfterDeploymentValidation event.

In an 36th exemplary aspect of the present disclosure, which may be used in combination with any one of more of the preceding aspects (i.e., the 34th aspect), where the code, when executed, is further configured to encoding bytecode using the revised metadata model as an input.

In an 37th exemplary aspect of the present disclosure, which may be used in combination with any one of more of the preceding aspects (i.e., the 36th aspect), where the bytecode is Java bytecode.

In an 38th exemplary aspect of the present disclosure, which may be used in combination with any one of more of the preceding aspects (i.e., the 34th aspect), where the code, when executed, is further configured to deploying the application to a cloud application server.

In an 39th exemplary aspect of the present disclosure, which may be used in combination with any one of more of the preceding aspects (i.e., the 34th aspect), where the code, when executed, is further configured to writing a serialized representation of an instance of the extension to bytecode.

In an 40th exemplary aspect of the present disclosure, which may be used in combination with any one of more of the preceding aspects (i.e., the 34th aspect), where collecting comprises recording a result of each class definition created during the firing of the event; and incorporating the results into the application In an 41st exemplary aspect of the present disclosure, which may be used in combination with any one of more of the preceding aspects (i.e., the 34th aspect), where the extension is a context and dependency injection (CDI) portable extension.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A system, comprising:
a memory; and
a processor in communication with the memory, wherein the processor is configured to perform:
compiling source code of an application, wherein the source code includes a portable extension;
creating a metadata model with metadata collected during the compilation of the source code;
instantiating the portable extension;
executing a plurality of events associated with the portable extension, wherein at least one of the plurality of events, when executed, creates changes in the metadata used to create the metadata model;
updating the metadata model with the changes in the metadata;
encoding bytecode using the metadata model as an input; and
writing a serialized representation of an instance of the portable extension to bytecode.

2. The system of claim 1, wherein the processor is further configured to perform:
recording a result of each class definition created during the execution of the plurality of events; and
incorporating the results into the application.

3. The system of claim 1, wherein the processor is further configured to perform:
incorporating the bytecode of the metadata model into the application.

4. The system of claim 1, further comprising:
a compiler in communication with the processor.

5. The system of claim 1, wherein the portable extension is a context and dependency injection (CDI) portable extension.

6. A method, comprising:
compiling source code of an application, wherein the source code includes a portable extension;
creating a metadata model with metadata collected during the compilation of the source code;
instantiating the portable extension;
executing a plurality of events associated with the portable extension, wherein at least one of the plurality of events, when executed, creates changes in the metadata used to create the metadata model;
updating the metadata model with the changes in the metadata;
encoding bytecode using the metadata model as an input; and
writing a serialized representation of an instance of the portable extension to bytecode.

7. The method of claim 6, further comprising:
recording a result of each class definition created during the execution of the plurality of events; and
incorporating the results into the application.

8. The method of claim 6, further comprising:
incorporating the bytecode of the metadata model into the application.

9. The method of claim 6, wherein the bytecode is Java bytecode.

10. The method of claim 6, wherein the portable extension is a context and dependency injection (CDI) portable extension.

11. A method, comprising:
receiving an application, wherein the application includes an extension and a metadata model;
instantiating the extension;
firing an event;
upon detecting the event at the instantiated extension, creating metadata associated with the application;
collecting the metadata associated with the application; and
revising the metadata model based on the collected metadata;
encoding bytecode using the revised metadata model as an input; and
writing a serialized representation of an instance of the extension to bytecode.

12. The method of claim 11, wherein the event is selected from the group consisting of a BeforeBeanDiscovery event, ProcessAnnotatedType event, AfterTypeDiscovery event, AfterBeanDiscovery event, and AfterDeploymentValidation event.

13. The method of claim 11, wherein the bytecode is Java bytecode.

14. The method of claim 11, further comprising:
deploying the application to a cloud application server.

15. The method of claim 11, wherein collecting comprises:
recording a result of each class definition created during the firing of the event; and
incorporating the results into the application.

16. The method of claim 11, wherein the extension is a context and dependency injection (CDI) portable extension.

* * * * *